Patented Nov. 11, 1924.

1,515,245

UNITED STATES PATENT OFFICE.

ALBERT N. ERICKSON, OF ELMHURST, NEW YORK, ASSIGNOR, BY MESNE ASSIGNMENTS, TO ELECTRO METALLURGICAL COMPANY, OF NEW YORK, N. Y., A CORPORATION OF WEST VIRGINIA.

RECOVERY OF VANADIUM.

No Drawing. Application filed February 25, 1922. Serial No. 539,120.

*To all whom it may concern:*

Be it known that I, ALBERT N. ERICKSON, a citizen of the United States, residing at Elmhurst, in the county of Queens and State of New York, have invented certain new and useful Improvements in the Recovery of Vanadium, of which the following is a specification.

This invention relates to the recovery of vanadium from its ores or compounds. More particularly, the invention comprises a process of obtaining vanadium in the form of an oxygenated or hydrated compound substantially free from contaminating elements.

I have discovered that impure solutions of vanadium, obtained by acid extraction of ores or in other ways, yield a substantially pure vanadium compound when subjected to treatment comprising reducing the vanadium to at least the trivalent stage, substantially neutralizing the solution and leaching the resulting precipitate with alkali. A particular advantage of the present invention is the efficient removal of phosphorus without serious loss of vanadium.

A preferred method of carrying out my process is as follows: A solution containing highly oxidized vanadium contaminated with phosphorus, and, it may be, with other impurities such as compounds of arsenic, copper, lead, iron, and zinc, is treated with a reducing agent, preferably a metal having a comparatively high solution tension, such as iron or zinc, in acid solution. If the vanadium-containing solution is sufficiently acid, the metal is placed directly therein; if alkaline or neutral, a suitable amount of acid is added before the introduction of the metal. Sulfuric acid solutions are among the most satisfactory. The reducing action should be allowed to continue until the vanadium is reduced to at least the trivalent condition.

When iron is used as the reducing metal, it serves also as a precipitant for arsenic, copper, lead, and other less electropositive metals which may be present, provided the iron is allowed to remain in the solution for a sufficient time. It is sometimes advisable to expedite the separation of these detrimental elements by separate chemical treatment. For example, hydrogen sulfid may be passed into the solution or a sulfid capable of reacting with dilute acid to yield that gas may may be added.

After the reduction and precipitation described, the solution is filtered to remove the insoluble impurities, leaving reduced vanadium contaminated with phosphorus compounds. The solution will ordinarily contain also a number of substances which remain soluble throughout the process and may therefore be neglected.

The acidity of the vanadium-phosphorus solution is next decreased to a definite extent by addition of a suitable base or salt. I prefer to use sodium carbonate and to add the same in small quantities until the diminishing effervescence indicates that the neutral point is being approached. The solution must remain slightly acid, in order to prevent precipitation of zinc, iron and other metals, as hydroxides or carbonates. If these elements were originally absent and were not introduced during the reducing step, precautions need not be taken to prevent excess of alkali. At this stage the temperature of the solution should be 60° C. or more; 70° is in general very satisfactory. A hydrated compound containing vanadium, probably in the trivalent condition, is precipitated when the solution approaches neutrality. The precipitate is contaminated with phosphorus and is of variable composition depending upon concentrations and conditions of reaction. I believe, however, that it is in general a hydrated compound of trivalent vanadium associated or combined, in part at least, with an acid of phosphorus. The separation of vanadium is substantially quantitative.

The vanadium hydrate containing phosphorus is filtered off and leached with an alkali, preferably a solution of sodium hydroxide of about 10% strength. This removes the phosphorus but is practically without solvent action on the reduced vanadium, when that is precipitated at the temperature stated above. When precipitated at room temperature, the vanadium shows a tendency to dissolve in the alkali, to some extent. The same is true when the vanadium is allowed to become oxidized by prolonged contact with the atmosphere, or in other ways, and such reoxidation should therefore be avoided. The leached residue is filtered off and washed. It consists of vanadium associated only with oxygen and hydrogen, and may be readily worked up into pure compounds of any desired kind.

The specific procedure herein described is illustrative only and is therefore not to be given a restrictive interpretation. I may, for example, reduce the vanadium electrolytically, or in other suitable ways instead of in the manner described. Equivalent methods for precipitating alkali-insoluble vanadium hydrate may also be adopted, and various other modifications may be made within the scope of the appended claims.

I claim:

1. Process of preparing a pure vanadium compound, which comprises treating an impure solution containing highly oxidized vanadium with a reducing agent until the vanadium is reduced to at least the trivalent stage, diminishing the acidity of the solution, whereby an impure vanadium precipitate is thrown down, and leaching the precipitate to remove soluble impurities therefrom.

2. Process of separating highly oxidized vanadium and phosphorus from an acid solution containing the same, comprising reducing the vanadium at least to the trivalent condition, bringing the solution nearly to the neutral point, whereby a precipitate containing vanadium and phosphorus is thrown down, and leaching the precipitate with alkali to remove phosphorus therefrom.

3. The invention according to claim 2, in which the solution contains contaminating elements other than phosphorus, and a sulfid is added to precipitate such of these elements as form sulfids insoluble in acid solution.

4. The invention according to claim 2, in which iron is added to the solution to reduce the vanadium.

5. The invention according to claim 2, in which the precipitation is effected when the solution is at a temperature of more than 60° C.

6. Process of preparing a pure vanadium compound from an acid solution containing the same contaminated with phosphorus and other elements, comprising adding a metal to the solution whereby the vanadium is reduced at least to the trivalent condition, bringing the solution substantially to the neutral point, leaching the resulting vanadium-phosphorus precipitate with alkali to remove the phosphorus therefrom, and washing the residual vanadium compound to remove residual alkali.

In testimony whereof, I affix my signature.

ALBERT N. ERICKSON